United States Patent [19]

Moehlenpah

[11] 4,024,809
[45] May 24, 1977

[54] APPARATUS FOR FABRICATING WOOD STRUCTURES

[76] Inventor: Walter G. Moehlenpah, 9906 Old Warson Road, Ladue, St. Louis County, Mo. 63124

[22] Filed: Oct. 14, 1975

[21] Appl. No.: 622,448

[52] U.S. Cl. .................. 100/100; 100/DIG. 13; 100/269 R; 144/288 C; 227/152; 269/321 F
[51] Int. Cl.² .......................... B30B 1/32
[58] Field of Search .......... 100/100, DIG. 13, 264, 100/269 R; 227/152; 144/288 C; 29/432, 200 J, 200 P; 269/321 F

[56] References Cited

UNITED STATES PATENTS

| | | | |
|---|---|---|---|
| 3,603,244 | 9/1971 | Jureit | 100/100 |
| 3,605,608 | 9/1971 | Dagley | 100/DIG. 13 |
| 3,713,381 | 1/1973 | Mort et al. | 100/100 |
| 3,728,958 | 4/1973 | Moehlenpah et al. | 100/100 |
| 3,826,188 | 7/1974 | Eberle | 100/100 |

*Primary Examiner*—Billy J. Wilhite

*Attorney, Agent, or Firm*—Koenig, Senniger, Powers and Leavitt

[57] ABSTRACT

Apparatus for fabricating wood structures, such as floor trusses, having an elongate bed supported above the floor on which wood members are held in position for being secured together by nailing plates to form a truss or the like. Tracks extend longitudinally along the bed and a press having a lower platen below the bed and an upper platen above the bed is movable along the tracks on rollers journaled on the lower platen. The platens extend transversely across the bed and are selectively operable to open and close for driving nailing plates into the wood members. The press as it is moved along the tracks is subject upon acceleration and deceleration to longitudinal forces above and below the tracks. The press is so structured as to have its center of gravity generally at the level of the rollers whereby the moments of the resultant forces about an axis at the level of the rollers are substantially equalized so as to substantially eliminate the tendency of the press to rock on the rollers as it is accelerated and decelerated.

4 Claims, 9 Drawing Figures

APPARATUS FOR FABRICATING WOOD STRUCTURES

BACKGROUND OF THE INVENTION

This invention relates to apparatus for fabricating wood structures, and is more particularly concerned with such apparatus especially adapted to fabricate flat floor trusses and other shallow depth trusses.

In conventional construction practice, solid wood members, such as 2 × 12's or the like, are used for floor joists. However, due to increased lumber costs and scaricty of long span lumber of the required dimensions, flat trusses made of less expensive lumber (e.g, 2 × 4's) are becoming increasingly popular for use as floor joists in place of solid wood joists. In addition to utilizing less expensive lumber, trusses are lighter weight and permit considerable labor savings because electrical wiring, plumbing and ventilation ducts may be readily routed through openings in the trusses. The trusses thus provide unobstructed surfaces at the top and bottom thereof to which ceiling or sub-floor sheathing panels may readily be nailed.

Truss fabricating apparatus, such as shown in my U.S. Pat. No. 3,866,530, has been developed for the manufacture of floor trusses. This apparatus supports wood members on stands and has two hydraulic presses mounted on carts which move automatically along a respective chord of the truss from one location therealong to another to drive nailing plates into the wood members simultaneously from above and below.

Other truss fabricating apparatus is known which may be utilized to fabricate flat floor trusses. This other apparatus utilizes a gantry structure movable along a bed on rails and having one or more platens movable toward the wood members for pressing nailing plates thereinto. In U.S. Pat. No. 3,605,608, the rails are shown to be on the outside of a fixed lower bed of reinforced concrete or the like and the gantry is shown to have an upper platen movable downwardly by means of a bell crank arrangement actuated by a hydraulic cyliner so as to drive the nailing plates into wood members supported on the bed. Here, the rails must carry the load as the upper platen engages the nailing plates on the wood members supported by the lower bed and drives the nailing plates into the wood members. This above-mentioned gantry-type apparatus, requires a substantial investment of labor and money to install, and once installed is immovable.

In U.S. Pat. No. 3,826,188, a gantry is shown movable along a track. The gantry has a lower platen at a fixed elevation and a pair of hydraulic cylinder units mounted on trolleys movable along an upper beam of the gantry above the lower platen for being positioned over a nailing plate location so as to press the nailing plate at that location into the wood members. The wood members are supported on a table above the lower platen. This table is supported by pivotal stands which are moved out of the way by the lower platen as the gantry travels along its tracks. This last-mentioned apparatus requires that the gantry be positioned along the truss at nailing plate locations and that the truss trolleys be adjusted along the gantry at the nailing plate locations. This is complicated and requires time which slows production.

In another known type of gantry truss fabricating machine, the wood members are supported on the upper surface of a table and a press frame is movable along the table to press nailing plates into the wood members. The table has an elongate beam at each side of the table with clearance below the beams and with the top of the table forming a bed for supporting the wood members. Each beam has a track on the inside of its web. The press frame has a carriage movable along the tracks below the bed, the cariage constituting a lower platen engageable with the bottom of the bed. The press frame further has an upper platen positioned above the table and a base below the carriage. The base is interconnected to the carriage by a pair of hydraulic cylinders. These hydraulic cylinders are actuable to open and close the upper and lower platens so as to bring the upper platen into engagement with the nailing plates positioned on the upper faces of the wood members and to bring the lower platen into engagement with the bottom of the table thereby to drive the nailing plates into the wood members. The carriage is power driven for movement along the tracks and is stopped at each nailing plate location along the truss being formed to drive the nailing plates into the wood members.

As this above-mentioned press frame is moved from nailing plate location to nailing plate location along the truss, it tends to rock in longitudinal direction of the table on its rollers as it is accelerated and decelerated. This tendency to rock may be so severe that it shakes the table and displaces or moves out of position the nailing plates pre-positioned on upper faces of wood members prior to their being driven into the wood members. In order to avoid this serious problem of displacing the nailing plates from their pre-positioned locations, users of this prior art machine have employed an individual manual hammering step on each nailing plate prior to pressing so as to temporarily retain them in their desired locations on the wood members and to thus prevent their being dislocated by the tendency by the press frame to rock as it is sequentially moved from one nailing plate location to another.

SUMMARY OF THE INVENTION

Among the many objects of this invention may be noted the provision of apparatus for fabricating shallow depth, flat floor trusses and the like which is adjustable to accommodate trusses of various depths, lengths and configurations; the provision of such apparatus in which the wood members may readily be held in position for being joined together by nailing plates; the provision of such apparatus in which the tendency the press frame to rock is substantially eliminated as it is accelerated and decelerated to move in a longitudinal direction along its tracks from one nailing plate location to another; the provision of such apparatus in which the bed supporting the wood members is not required to carry the load applied to the wood members for driving the nailing plates thereinto; the provision of such apparatus which can drive one or more nailing plates into wood members at any position transversely of the bed between the platens of the press frame without adjustment of the platens transversely of the bed; the provision of such apparatus which enables two trusses to be fabricated simultaneously; the provision of such apparatus which may be readily transported from one location to another and which may readily be installed; and the provision of such apparatus which is rugged in construction, reliable in operation and is relatively low in cost. Other objects and features of this invention will be in part apparent and in part pointed out hereinafter.

Briefly, apparatus of this invention comprises an elongated bed for holding members to be nailed, means supporting the bed with space below the bed, and tracks extending longitudinally of the bed below the bed. A press for driving nailing plates into members on the bed is movable along the tracks. The press has a lower platen extending transversely of the bed below the bed and support means adapted to engage the tracks, an upper platen extending transversely of the bed above the bed, and power means interposed between the platens operable to move the upper platen down from a raised position above the bed into engagement with nailing plates on the members on the bed and to move the lower platen up into engagement with the bottom of the bed. The press further includes means for moving the press from place-to-place along the tracks. As it is moved the press is subject, upon acceleration and deceleration, to longitudinal forces above and below the level of the roller means, and is structured to have its center of gravity generally at the level of the support means whereby the movements of the resultants of the forces about an axis transverse of said bed at the level of the support means are substantially equalized so as substantially to eliminate the tendency of the press to rock on the support means upon acceleration and deceleration thereof.

BRIEF DESCRIPTION OF THE DRAWINGS

Corresponding reference characters indicate corresponding parts throughout the several views of the drawings.

DESCRIPTION OF A PREFERRED EMBODIMENT

Referring now to the drawings, apparatus of this invention, as indicated at 1, fabricates wood structures, such as trusses T, having a plurality of wood members W which are secured together by nailing plates N driven into two or more of the wood members at the intersections or the joints of the truss. As indicated generally at 3, apparatus of this invention has a table for supporting wood members W which are to be joined together by nailing plates N. Table 3 comprises a pair of elongated, parallel I-beams 5a, 5b spaced from one another and supported above the floor with clearance therebelow by legs 7 at the ends of the beams. A series of plates 9 spans between the beams at the top thereof and forms a bed on which the wood members are supported. On the inside of each I-beam 5a, 5b, a respective track 11a, 11b is provided for purposes as will appear.

Figure 3:
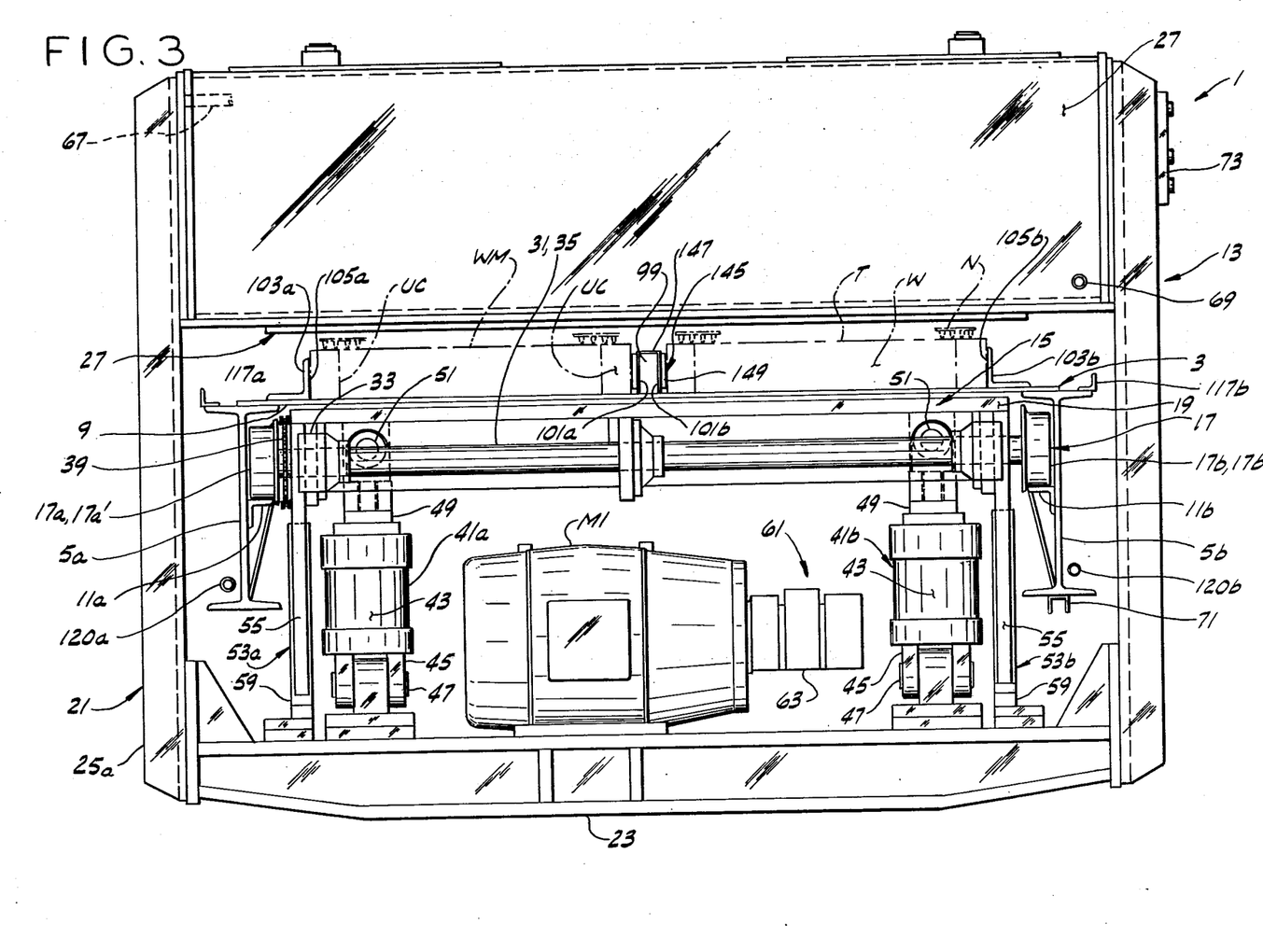
FIG. 3 is an enlarged vertical cross-section taken on line 3—3 of FIG. 2 illustrating a press frame movable longitudinally along a table supporting the wood structure for driving nailing plates into two or more of the wood members for securing the wood members together.

In accordance with the apparatus of this invention, a press, generally indicated at 13, is movable lengthwise along table 3 for driving nailing plates N into wood members W. This press comprises a lower platen 15 (see FIGS. 3 and 4) extending between tracks 11a, 11b below bed plates 9 and having a plurality (e.g., four) rollers, as generally indicated at 17, journalled thereon and rollingly engageable with tracks 11a, 11b. These rollers constitute means for supporting the press on the tracks. It will be understood that means other than rollers (e.g., slide blocks, air bearings or the like) may be used to support the press on the tracks. As best shown in FIG. 3, two of these rolers 17a, 17a' are journalled on one end of the lower platen for rolling along a respective track 11a, and the other pair of rollers 17b, 17b' are journalled on the other end of the lower platen for rolling along track 11b. Lower platen 15 is so structured as to be rigid and has an upper plate 19 disposed below bed plates 9 when the rollers are in rolling engagement with the tracks. Press 13 further includes a load frame generally indicated at 21 surrounding beams 5a, 5b. This load frame has a base 23 below lower platen 15 extending transversely of the bed and extending outwardly beyond beams 5a, 5b. A respective side arm 25a, 25b is secured to a respective outer end of base 23. These arms extend up above the level of the bed plates on the outside of the beams. An upper platen, as generally indicated at 27, is secured to the upper ends of arms 25a, 25b. This upper platen extends transversely of the bed above the level of wood members W and nailing plates N positioned on the upper faces of the wood members and is positioned directly above lower platen 15.

Figures 4, 6:
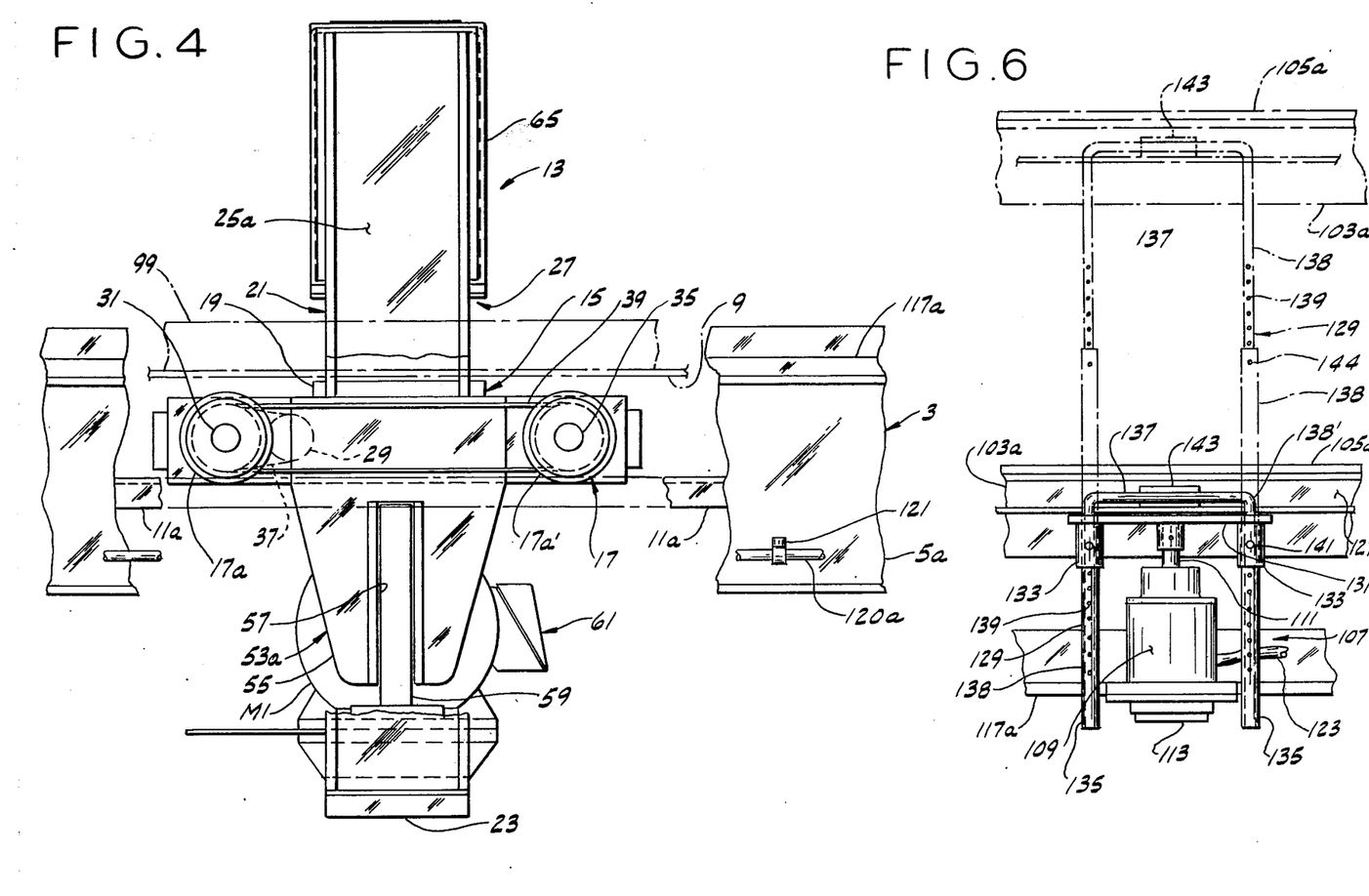
FIG. 4 is a left end elevational view of the gantry press shown in FIG. 3.
FIG. 6 is an enlarged plan view of the apparatus taken on line 6—6 of FIG. 5.

Press 13 is movable longitudinally along table 3 on tracks 11a, 11b by means of a hydraulic drive motor 29. As best shown in FIG. 4, rollers 17a, 17b are secured to an axle 31 which in turn is journalled on lower platen 15 by means of bearings 33, and rollers 17a', 17b' are secured to another axle 35 which is also journalled by bearings 33 on the lower platen. Drive motor 29 is drivingly connected to axle 31 by a chain and sprocket drive 37. Axle 31 is drivingly connected to axle 35 by means of another chain and sprocket 39 so that all four rollers are positively driven at the same speed. This insures that the press is driven along tracks 11a, 11b without cocking or canting on the tracks as may be caused by one of the rollers being driven at a slightly different speed than the others.

Frame 21 is connected to lower platen 15 by a pair of hydraulic cylinder units 41a, 41b for effecting movement of the upper platen 27 and the lower platen toward and away from one another between an open position (as shown in FIG. 3) in which the platens are clear of the wood members W, nailing plates N on the wood members, and bed plates 9, and a closed position (not shown) in which the platens close on one another and on the wood members supported on the bed to drive the nailing plates into the wood members at at least one joint of truss T. Hydraulic cylinder units 41a, 41b are identical and each has a cylinder body 43 having a clevis end fitting 45 for being pinned to base 23 by a pin 47 extending transversely of table 3, and a piston rod 49 extending out from the other end of the cylinder body for in and out movement relative thereto. The outer end of the piston rod 49 is pinned to the lower platen by a pin 51 at right angles to pin 47. With the cylinder units so pinned to the base and to the lower platen by pins 47 and 51 at right angles to one another, only limited pivotal movement of the cylinder units is permitted relative to the lower platen and to the base.

Adjacent each cylinder unit 41a, 41b, a respective guide generally indicated at 53a, 53b is provided for preventing tilting of bed frame 21 relative to lower platen 15 and for permitting relative movement of the frame and the carriage as the platens are opened and closed by the hydraulic cylinder units. Each of these guides are identical and thus only guide 53a will be described in detail.

In FIG. 4, guide 53a is shown to comprise a clevis plate 55 secured to the bottom of lower platen 15 on the outside of cylinder unit 41a. This guide plate has a vertical slot 57 therein with its lower end open. Base 23 has an upwardly extending guide finger 59 secured thereto adapted to be slidingly received in slot 57. This guide finger has a close sliding fit within slot 57 and thus permits relative movement of the base toward and away from the carriage for opening and closing the platens and inhibits tilting of the frame in the longitudinal direction of table 3.

A hydraulic system, as generally indicated at 61, is mounted on base 23 below the level of rollers 17 to supply hydraulic fluid under pressure to motor 29 and to hydraulic cylinder units 41a, 41b. This hydraulic system includes a relatively heavy electric motor M1, a hydraulic pump 63, and various other hydraulic components for controlling operation of motor M, hydraulic cylinder units 41a, 41b, and motor 29 in a manner well known to those skilled in the art. Hydraulic system 61 is supplied hydraulic fluid from a sump tank 65 mounted above the level of rollers 17 and table 3. More specifically, tank 65 is shown to extend transversely of the table between the upper ends of the arms 25a, 25b. This tank is rigidly constructed and constitutes upper platen 27. Tank 65 has an inlet 67 for the inflow of hydraulic fluid and an outlet for the outflow of hydraulic fluid to pump 63 and has appropriate baffles (not shown) therein to minimize slosh of the hydraulic fluid in the tank as press frame 13 is accelerated and decelerated as it moves in longitudinal direction along the table from one nailing plate location to another. Tank 65 may, for example, contain 50 gallons (189.3 l.) of hydraulic fluid (oil). Power is supplied to motor 1 by bus conductors within an open power conduit 71 secured to I beam 5b, the carriage having appropriate slide contacts thereon protruding into the conduit for engagement with the conductor busses.

As previously mentioned, press 13 is subject to repeated accelerations and decelerations as it is moved along tracks 11a, 11b from one nailing plate location to another. The portions of the press above and below the level of rollers 17 are thus subject to longitudinal inertial forces as the press accelerates and decelerates. In prior art presses, such as heretofore described, these longitudinal inertial forces tended to rock the press (i.e., tended to shift the weight of the press in longitudinal direction from one roller pair to another) each time the press was started or stopped as it was moved along the tracks. This shifting of weight on the tracks caused the longitudinal beams supporting the bed of flex vertically even though the beams were sufficiently stiff to readily support the weight of the press as it was moved along the bed. As previously mentioned, the flexing of the bed of these prior art presses may be so severe that the nailing plates were dislocated from their pre-positioned locations and that in some instances users of the prior art presses were required to temporarily secure the nailing plates in position prior to their being pressed into the wood members to prevent their dislocation as the press was moved from one nailing plate position to another. The apparatus 1 of the present invention overcomes this serious problem and thus allows press 13 to be moved from nailing plate location to nailing plate location at high speed without disturbing the nailing plates pre-positioned on the wood members. By enabling press 13 to be moved rapidly without disturbing the nailing plates, high production rates can be attained with the apparatus of this invention.

Press 13 of the present invention is so structured as to have its center of gravity generally at the level of rollers 17 (i.e., the support means). Thus, the resultant moments of the longitudinal inertial forces act about an axis transverse to table 3 generally at the level of the rollers and are substantially equalized so as to eliminate or to greatly lessen the tendency of the press 13 to rock on rollers 17 upon acceleration and deceleration of the press. More particularly, press 13 is so structured that the resultant moments of the longitudinal inertial forces acting on the portion of frame 21 below the level of rollers 17 and on hydraulic system 61 including motor M1 are substantially equal to the resultant moment of the longitudinal inertial forces acting on the portion of frame 21 above the level of the rollers including upper platen 27 (i.e., tank 65 and the hydraulic fluid contained therein).

Ideally, the center of gravity of press 13 should be located at the bottom of rollers 17 (i.e., at the level of tracks 11a, 11b) equidistant between the rollers. However, if the center of gravity is located within a few inches above or below the bottom of the rollers (i.e., located generally at the level of the rollers), the tendency of the press to rock on the rollers is substantially reduced and beams 5a, 5b do not significantly flex as the press is accelerated and decelerated during movement from one nailing plate to another along the table 3. It is also preferable that the rollers or support means be located an equal distance in both fore and aft directions of press 12 relative to its center of gravity.

Operation of press 13 and more particularly operation of motor 29 and hydraulic cylinders 41a, 41b is controlled by a plurality of pushbutton switches in a switch box 73 (see FIG. 3). These pushbutton switches control operation of hydraulic system 51 via solenoid operated hydraulic valves of the type well known to those skilled in the art.

Figure 1:
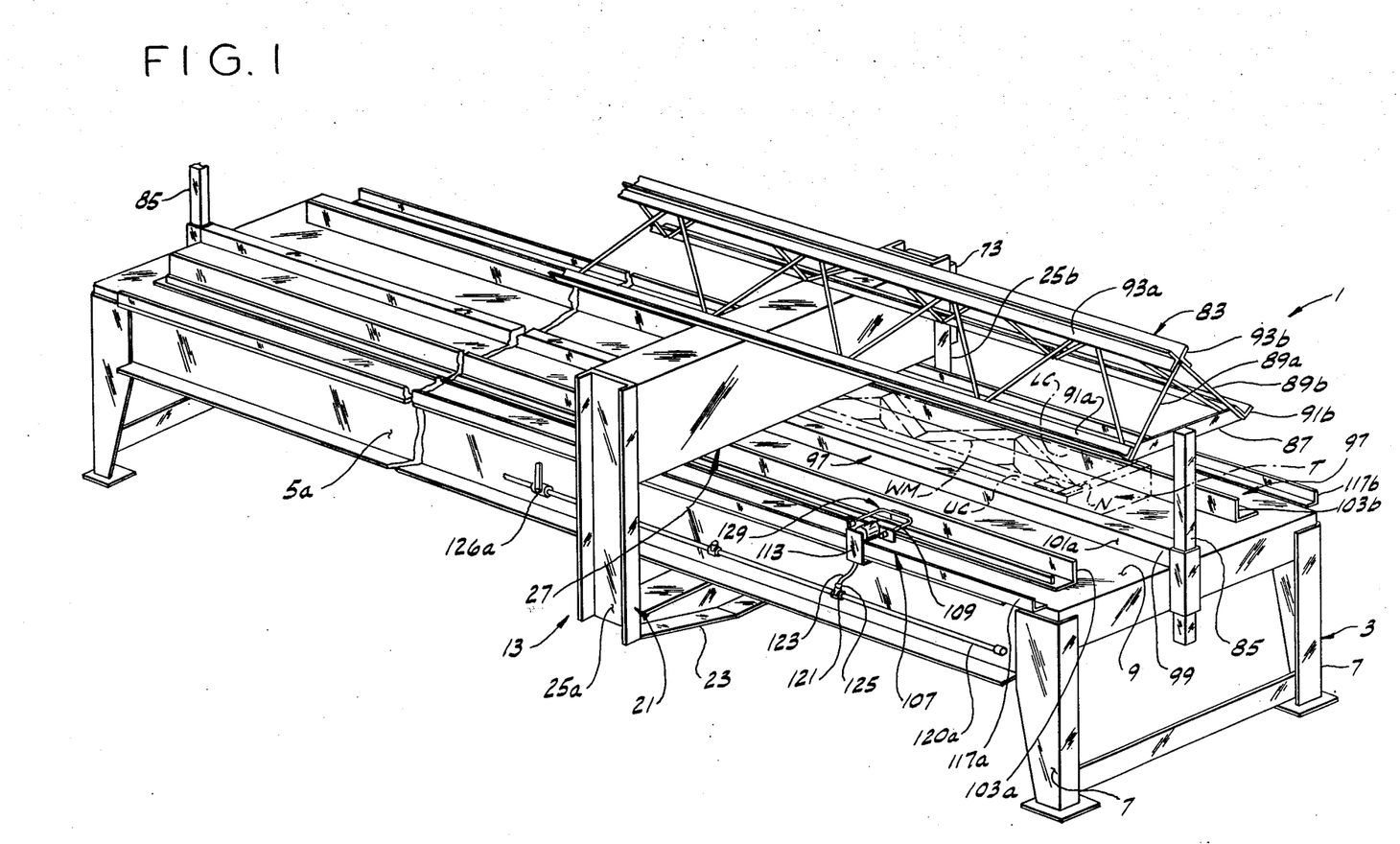
FIG. 1 is a perspective view of apparatus of this invention for fabricating wood structures.
Figure 2:
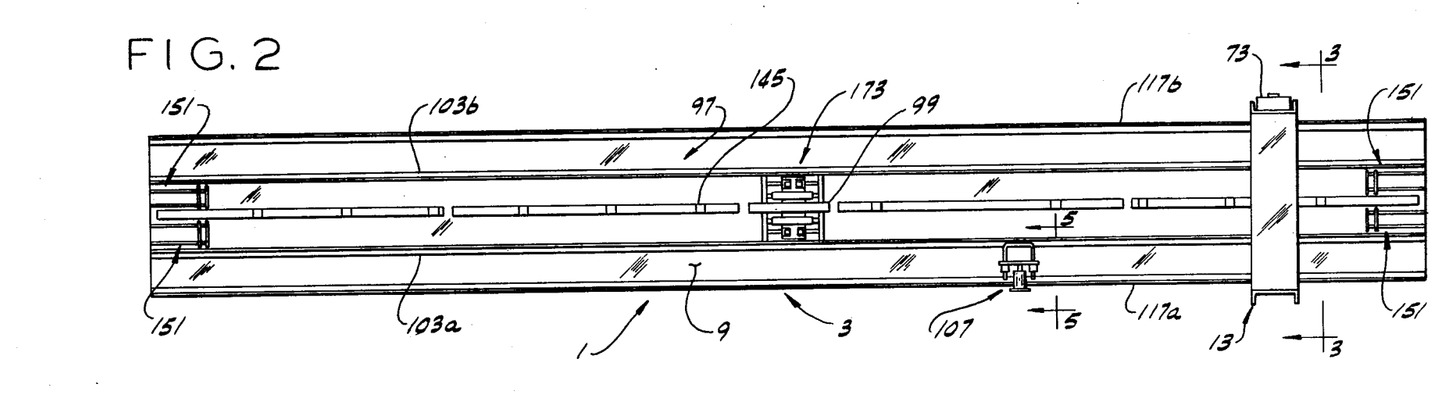
FIG. 2 is a plan view of the apparatus of FIG. 1 with parts broken away.

As shown in FIG. 1, apparatus 1 has an elongate overhead support 83 extending lengthwise of table 3 above tank 63. This support is carried by posts 85 and is positioned generally above the longitudinal center point of the table. This support is shown to be a lattice truss of triangular cross section having a generally lower horizontal face 87 and inclined side faces 89a, 89b. Each of these side faces has a lower rail 91a and 91b, respectively and an upper rail 93a, 93b, respectively, for engaging the upper and lower edges of boxes 95 of nailing plates N. In this manner, a box of nailing plates can be supported at any position along the support over a nailing plate location so that with their tops removed, boxes of nailing plates may be provided at locations readily accessible by workman operating the apparatus of this invention.

In fabricating flat floor trusses T as shown in FIG. 1, the truss normally has spaced parallel upper and lower chord members UC and LC and web members WM extending between and abutting against the upper faces of the chord members. These wood members are held in their desired assembled position on the upper surface of bed plates 9 by means as generally indicated at 97. More particularly, means 97 comprises an abutment bar 99 secured to bed plates 9 and extending substantially along the longitudinally center line of table 3. This abutment bar is shown to be a hollow tubular box beam of a rectangular cross-section having generally vertical outer faces 101a, 101b for engagement with the outer face of a respective chord member of truss T being fabricated. On each side of the abutment bar a respective clamp bar 103a, 103b is provided. These clamp bars are generally parallel to the abutment bar and are slidable on the upper surface of the bed plates 9 toward and away from the abutment bar between the retracted position in which the clamping bar is clear of the outer face of an adjacent chord member of truss T being fabricated. And an extended clamping position in which a vertical face 105a, 105b of the clamping bar engages the outer face of its respective chord member and forces the outer chord member toward the inner chord member into abutting engagement with the abutment bar 99 so as to hold the chord members in selected abutting engagement with their respective web members WM for being secured together by nailing plates N.

Figures 5, 7, 8:
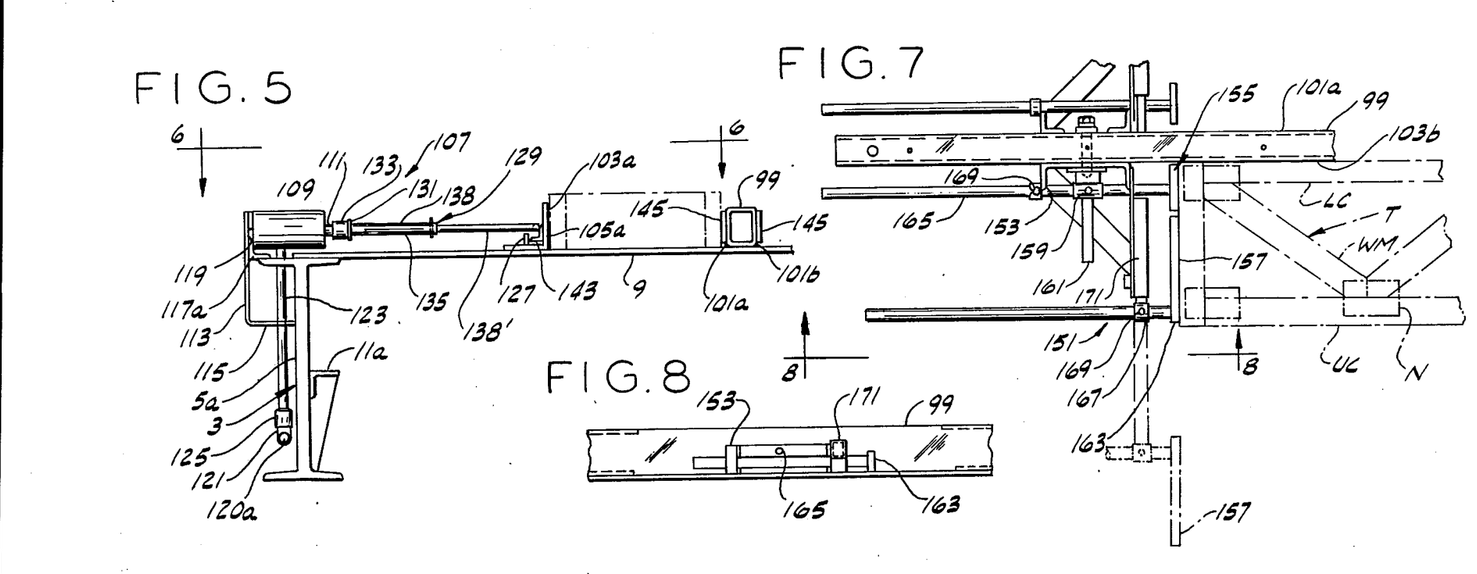
FIG. 5 is an enlarged vertical cross-section taken on line 5—5 of FIG. 2.
FIG. 7 is a enlarged plan view of a portion of the apparatus illustrating means for locating the ends of the truss being formed.
FIG. 8 is an end elevational view of FIG. 7 taken on line 8—8 of FIG. 7.

As indicated at 107, a plurality of air cylinder units is provided engageable with clamping bars 103a, 103b for moving the clamping bars between their retracted and clamping positions. Each of these air cylinder units comprises a cylinder body 109 and a piston rod 111 extending out from one end of the cylinder body toward abutment bar 99. Preferably, these air cylinder units are spring loaded so as to retract their piston rods 111 and to automatically move clamping bars 103a, 103b from their extended clamping positions to their retracted positions upon the removal of air pressure from their cylinder bodies. A bracket 113 is provided on the other end of the cylinder body for releasable securement of the air cylinder to table 3 at any desired position therealong. In FIG. 5 a bracket 113 is shown to be an angle-shaped member extending down below table plates 9 and having an inwardly extending horizontal leg 115 engageable with the web of a respective table I-beam 5a or 5b. A flange 117a, 117b is secured to table 3 at each outer edge thereof these flanges extending the length of the table and extending above height of bed plate 9. It will be particularly noted that the upper edge of these flanges are somewhat below the centerline of piston rod 111 of cylinders 107 for purposes as will appear. Bracket 113 has a slot 119 therein for reception of a respective flange 117a, 117b. Thus, to secure an air cylinder unit 107 to table 3 at any position therealong, the air cylinder is lowered onto to the table so that a respective flange 117a or 117b is received in slot 119 and so that leg 115 engages a respective beam 5a or 5b. Thus, the flange engages the outer end of cylinder body 109 so as to serve an abutment as piston rod 111 is extended and bracket 113 engages the outer face of the flange to hold the cylinder unit against movement as clamping bars 103a, 103b are retracted. As shown in FIGS. 3 and 6, an air supply conduit 120a, 120b is secured to the outer face of the web of respective I-beams 5a, 5b. These conduits have quick disconnect fittings 121 spaced at intervals therealong. Each air cylinder unit 107 has an air hose 123 having a fitting 125 on its free end which may be plugged into a fitting 121 thereby to supply compressed air to the air cylinder unit. Thus air cylinder units 107 may be located in any position along beams 5a, 5b and may readily be supplied with compressed air. Conduits 120a, 120b are provided with respective hand operated valves 126a, 126b for supplying air under pressure simultaneously to all air cylinder units 107 plugged into conduits 120a, 120b. By actuating valves 126a, 126b, clamping bars 103a, 103b, respectively, may be operated so as to move between their retracted and extended positions so as to uniformly engage the chord members of trusses T being fabricated.

Each clamping bar 103a, 103b has an upwardly opening slot 127 therein extending lengthwise of the bar. Each air cylinder unit has an adjustable bracket 129 secured to the outer end of its piston rod 111 for releasably engaging its respective clamping bar. This bracket includes a rigid bar 131 secured to the outer end of the piston rod and extending perpendicularly thereto. This bar has tubular collars 133 on its outer ends with bores therethrough. The bracket further includes a U-shaped member having parallel spaced legs 135 which are received in the bores of collars 133, and a base 137, this U-shaped member being made of metal tubing or the like. Legs 135 have an outer tubular portion 138 which telescopically receives an inner tubular portion 138', these outer and inner tube portions each having a series of spaced apertures 139 therethrough for reception of pins 141 so as to lock the telescopic inner and outer tube portions relative to one another. The legs may also be adjustably secured relative to collars 133 by other pins 141 which are received in apertures provided in the collars and in apertures 139 in the tubular legs. Thus, bracket 129 may be adjustably positioned to accommodate trusses T having a maximum specified depth and a minimum specified depth. When adjusted to accommodate trusses of its specified maximum depth, base 137 is positioned adjacent bar 131 and legs 135 extend through the bores in collars 133 and back along the sides in cylinder body 109 above the upper edges of flanges 117a, 117b. When adjusted for trusses of minimum depth, base 137 is positioned adjacent abutment bar 99 and legs 135 are extended (as shown in phantom in FIG. 6).

Base 137 has an attachment 143 which is received by slot 127 in its respective clamp bar 103a, 103b. Upon extension of piston rod 111 attachment 143 engages the inner edge of the slot and pushes the clamp bar in toward abutment bar 99 thereby to forcibly clamp the wood members W together between the clamp bar and the abutment bar. Upon retraction of the piston rod, the attachment engages the outer face of the slot and pulls the clamp bar away from the wood members to its retracted position thereby to unclamp truss T.

The chords UC and LC of truss T fabricated on apparatus of this invention may be performed to have a predetermined curvature or camber. This may be accomplished by placing a plurality of shims 145 (see FIGS. 3, 6 and 7) on abutment bar 99 so that upon actuation of air cylinder units 107 to move a clamping bar 103a or 103b to its clamping position in engagement with wood members W of truss T being fabricated, the chord member in engagement with shim 145 is bent along its length. Each shim 145 comprises a U-shaped clip 147 adapted to be releasably clipped on abutment bar 99 from above so that the legs of the clip extend down along vertical faces 101a, 101b of the abutment bar. Spacer shims 149 of predetermined thicknesses are secured to the outer faces of clip legs for engagement with the outer face of the adjacent chord member. Spacer shims 149 may be varying thickness and shims 145 may be positioned at predetermined locations along abutment bar 99 so as to bend the chord member along a predetermined curvature. For example, it may be desirable to provide the truss with a camber so that the middle of the truss is bowed up. To fabricate such a truss, the spacer shims 149 at the end of the truss must be somewhat thicker than the shims at the center of the truss.

As generally indicated at 151, an end lumber stop is provided at each end of each truss T being fabricated for engagement with the ends of the truss to hold wood members W constituting the ends of the truss at any selected position on bed plates 9. More particularly, this end lumber stop is shown to comprise a frame 153 releasably secured to abutment bar 99 and stop members 155 and 157 adjustably movable relative to the frame for engagement with the wood members W. Frame 153 has a cam type clamp arrangement 159 actuable by a handle 161 for releasably clamping and unclamping the frame to the abutment bar at selected positions therealong. Stop members 155 and 157 are adjustably movable relative to frame 153 in a direction parallel to abutment bar 99 for engagement with the ends of the truss T. Each stop member comprises a foot 163 and a slide shaft 165, the latter being slidably received by a slide bushing 167 carried by the frame. Slide bushings 167 each have a clamp bolt 169 for fixing slide shaft 165 thereto so as to hold the stop members in any adjusted position with respect to frame 153. This prevents the wood members from moving in endwise direction from a selected position. Stop member 157 is carried in a slide bushing 171 and is slidable inwardly and outwardly (see FIG. 7) from a closed or inner position (shown in solid lines) to an open or outer position (shown in phantom). In this manner end stops 151 can accommodate trusses having a depth ranging between a specified minimum and maximum depth.

Figure 9:
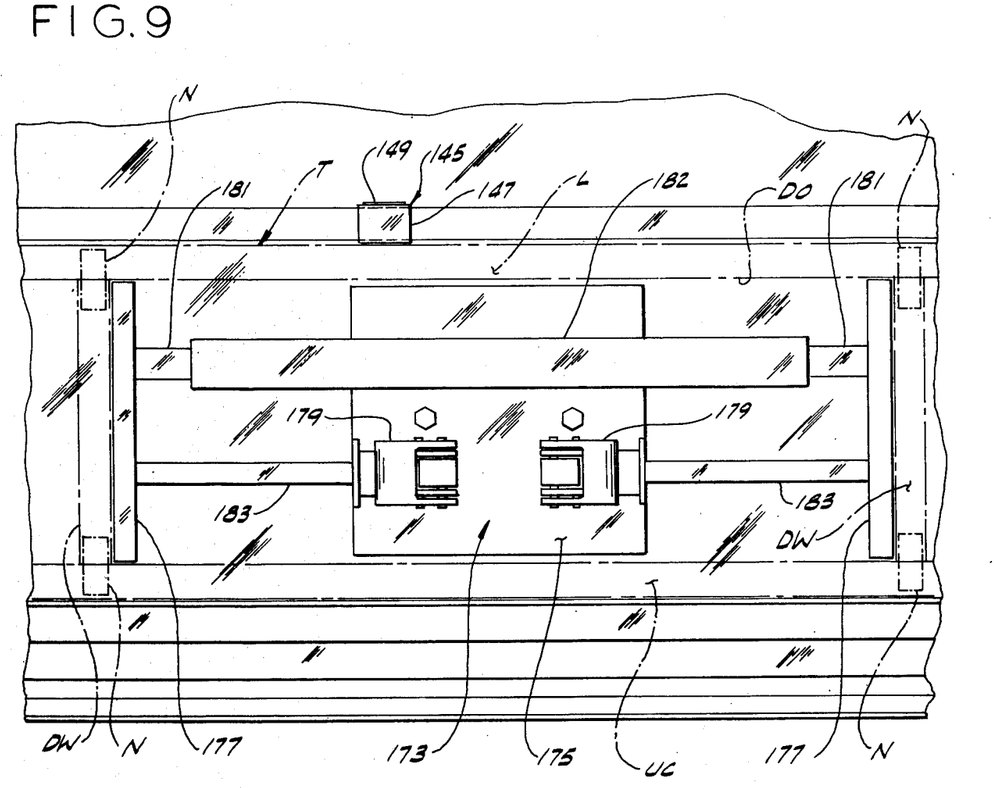
FIG. 9 is an enlarged plan view of a portion of the apparatus shown in FIG. 2.

Oftentimes, floor trusses T are fabricated with a relatively large duct opening DO forming therein for reception of a ventilating duct or the like (see FIG. 9). By providing such openings in a floor truss, the ventilating ducts of a building may readily be routed through the trusses. This duct opening is shown to be a rectangular opening defined by upper and lower chord members UC and LC of the truss and by a pair of adjacent duct web members DW which are arranged perpendicularly to the chord members. A toggle linkage clamp, as generally indicated at 173, is provided for holding duct web members DW in their selected positions for being secured to chord members UC and LC by nailing plates N. This duct opening clamp includes a base plate 175 releasably secured (e.g., bolted) to bed plates 9 and a head 177 at each side of the base plate movable outwardly toward the ends of truss T from an inner retracted position (not shown) and which the web members DW may be positioned in their selected locations and an extended position (as shown in FIG. 9) in which each of the heads engage the inner face of a respective duct web member DW thereby to hold the latter in its selected location. A toggle linkage 179 is actuable for simultaneously moving both of the heads between their retracted and extended positions. Each head 177 has a slide rod 181 secured thereto, the slide rod being received in a slide bushing 182 secured to base plate 175. An actuator rod 183 interconnects each head with its respective toggle linkage.

In operation with end stops 151a, 151b adjusted for the length and depth of truss T to be formed, with brackets 129 on air cylinder units 107 adjusted for the depth of the truss to be fabricated, with shims 145 positioned along abutment bar 99 to form the truss with the desired camber, and with the wood members W in place on the table 3 on one side of abutment bar 99, air valves 126a, or 126b are activated thereby to pressurize air cylinder units 107 on one side of table 3 so as to move a respective clamping bar 103a or 103b toward the abutment bar for engagement with the outer chord of the truss T for holding the wood members in their desired positions relative to one another for being secured together by nailing plates N. A workman then places nailing plates N on the upper surfaces of the wood member at the joints of the truss. Motor M1 is then energized by depressing a pushbutton switch on control box 73. Preferably hydraulic cylinders 41a, 41b are automatically pressurized upon start up to motor M so as to open the platens of press 13. The workman then depresses another pushbutton switch to supply hydraulic fluid under pressure to motor 29 thereby to drive carriage 15 along tracks 11a, 11b from a position clear of the end of the truss to a first nailing plate location adjacent that end of the truss. The gantry press unit 13 is stopped so that one or more nailing plates to be driven are located below the upper platen of the press. The workman then depresses still another pushbutton switch to close the platens and to drive the nailing plates into the wood members. Press frame 13 is then moved clear of the truss and air valves 126a or 126b is opened to relieve pressure from air cylinder units 107 thereby to effect unclamping of truss T.

The partially completed truss T is lifted from table 3, turned over and placed on the table on the opposite side of abutment bar 99. New wood members W are positioned on table 3 on the side of the abutment bar from which the partially completed truss was removed. Air cylinders 107 on both sides of the abutment bar are then pressurized to clamp both of the partially completed truss and the newly positioned wood members. Nailing plates are then positioned at the joints of each of the trusses and the press frame is moved along the length of the truss and actuated at each nailing plate location to simultaneously drive nailing plates into both trusses supported on the table. In this manner it will be noted that on each pass of the press frame a completed truss is fabricated with nailing plates driven into both sides of the wood members.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for fabricating wood structures, such as trusses, having a plurality of wood members nailed together by nailing plates comprising:

an elongate bed for holding members to be nailed with space below the bed;

tracks extending longitudinally of the bed below the bed;

a press for driving nailing plates into members on the bed and movable along the tracks, said press having a plurality of rollers for supporting said press on said tracks as it is moved therealong, a lower platen extending transversely of the bed below the bed, an upper platen extending transversely of the bed above the bed, said upper platen having arms extending downwardly on the outside of said bed below said tracks and a base extending between the lower end of said arms below said bed, and power means including at least one hydraulic cylinder unit interposed between said base and said lower platen operable to move the upper platen down from a raised position above the bed into engagement with nailing plates on the members on the bed and to move the lower platen up into engagement with the bottom of the bed;

means for moving the press from place-to-place along the tracks, the press being subject upon acceleration and deceleration as it is moved to longitudinal forces above and below the level of said rollers; and a hydraulic pressure system for said hydraulic cylinder unit and a tank containing a supply of hydraulic fluid for said system, said system being mounted on said base below said rollers and said tank being carried by the press above the level of the rollers whereby the center of gravity of the press is generally at the level of said rollers with the resultant inertial moments of the press and the hydraulic system below the level of the rollers and with the resultant inertial moments of the press and said tank and the fluid therein above the level of said rollers being substantially equalized so as substantially to eliminate the tendency of the press to rock on said rollers upon acceleration and deceleration of the press.

2. Apparatus as set forth in claim 1 wherein said plurality of rollers comprises two pairs of rollers with each pair engageable with a respective track, and with the rollers of each pair being equally spaced from said axis on opposite sides thereof.

3. Apparatus as set forth in claim 2 wherein the center of gravity of said press is located generally equidistantly between said rollers of each said pair of rollers.

4. Apparatus as set forth in claim 1 wherein said tank extends transversely of said bed above the level thereof and is secured to the upper ends of said arms, said tank constituting said upper platen.

* * * * *